March 3, 1964   A. D. JACKSON ETAL   3,123,322
AIRCRAFT POWER PLANT
Filed Jan. 2, 1962
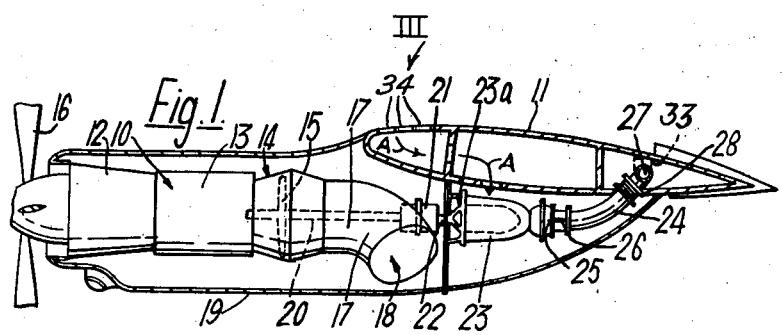
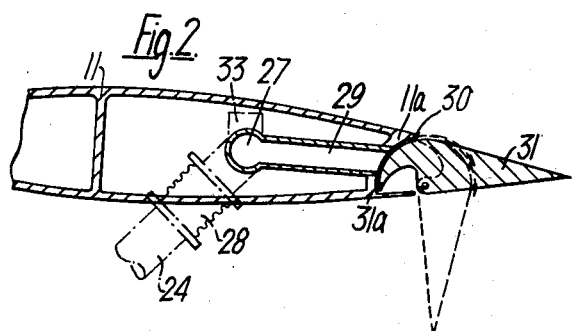
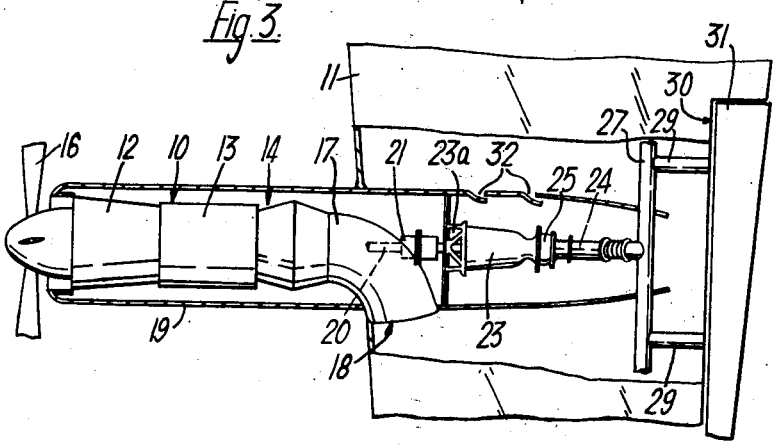

3,123,322
AIRCRAFT POWER PLANT
Alfred Dennis Jackson, Derby, Rowan Herbert Colley, Sunnyhill, and James Alexander Petrie, Littleover, England, assignors to Rolls-Royce Limited, Derby, England
Filed Jan. 2, 1962, Ser. No. 163,684
Claims priority, application Great Britain Jan. 14, 1961
6 Claims. (Cl. 244—42)

This invention relates to aircraft power plant and in particular, but not exclusively, to the control of the airflow over the outer surface of the aircraft control surfaces.

It is desirable to prevent the airflow over the control surfaces breaking away from the surfaces as this gives rise to loss in efficiency caused by the generation of turbulence downstream of the point of break-away.

One of the objects of this invention is to provide means for controlling or preventing the break-away of the airflow over the aircraft control surfaces.

According to the present invention an aircraft includes one or more forward propulsion engines, at least one of said engines being arranged to drive an auxiliary compressor which supplies compressed air to ducting leading to control surfaces of the aircraft, said compressed air being discharged to atmosphere over the control surfaces in order to prevent break-away of the normal atmospheric airflow over said surfaces.

The auxiliary compressor may receive atmospheric air through louvres or apertures provided in surfaces of the aircraft wings or in the nacelle or nacelles housing the engine or engines; the passage of said atmospheric airflow through said louvres or apertures may also prevent break-away of the airflow over said wings or nacelle.

The said control surfaces over which the compressed air is directed to flow are preferably the control flaps situated along the downstream edge of the aircraft wings.

Preferably each auxiliary compressor is driven from its associated forward propulsion engine through a clutch device operable by the pilot.

The ducting leading to the control surfaces may comprise a first main duct, a second duct connecting the delivery end of each auxiliary compressor with the main duct and one or more third ducts connecting said main duct with the control surfaces.

Preferably each of said second ducts includes valve means which close off said second duct when the associated auxiliary compressor is not being rotated.

The main duct may be provided with a control valve which is opened to atmosphere when the auxiliary compressors are being started, and closed when auxiliary compressors are being rotated at correct speed.

Preferably the forward propulsion engines are turbo-propeller gas turbine engines but they may be gas turbine jet reaction engines, or piston engines.

The auxiliary compressor associated with each forward propulsion engine is preferably, but not exclusively, of the axial-flow compression type.

According to the present invention in another aspect a forward propulsion engine for an aircraft is arranged to drive an auxiliary compressor which delivers compressed air to ducting leading to control surfaces of said aircraft.

One embodiment of the present invention will now be described with reference to the accompanying drawings in which:

FIGURE 1 is a transverse section through an aircraft wing and engine nacelle incorporating the present invention.

FIGURE 2 is a transverse section through an aircraft wing showing the control flaps, and FIGURE 3 is a view taken in the direction of the arrow III indicated on FIGURE 1 with parts broken away to show the forward propulsion engine and to show a slightly modified arrangement for supplying air to the auxiliary compressors.

Referring to the drawings a turbo-propeller gas turbine engine 10 is supported from an aircraft wing 11 by means of a support structure (not shown). Only one propulsion engine 10 on one side of the aircraft is shown, it being understood the aircraft may have one or more engines on each side thereof.

The engine 10 comprises high and low pressure compressors contained in a compressor casing 12, combustion equipment 13 in which fuel is burned in the air compressed in the compressors before passing through high and low pressure turbines 14 to drive them. The turbines 14 are arranged to drive the compressors and the low pressure turbine, indicated at 15, is also arranged to rotate the propeller blades 16 through reduction gearing (not shown). After driving the turbines 14 the hot gases pass to atmosphere through an exhaust duct 17 which has its outlet 18 in the wall of the engine nacelle 19. The engine nacelle 19 merges into the surface of the aircraft wing 11 and forms a smooth casing surrounding the engine 10.

The engine 10 is also provided with an external drive shaft 20 which has one end connected to the low pressure turbine 15 and its other end connected to a clutch device 21. An output shaft 22 from the clutch device 21 is connected to the shaft of an auxiliary axial-flow compressor 23 which at its front end has an air intake 23a.

The delivery end of the auxiliary axial-flow compressor 23 is connected to a conduit 24 via a part-spherical coupling 25, and the conduit 24 is provided with a pivoted flap valve 26 located adjacent the coupling 25. The downstream end of the conduit 24 is connected to a main conduit or manifold 27 via a flexible connection 28 for supplying compressed air to all of the control surfaces. Conduits 29 connected to the main conduit or manifold 27 distribute the compressed air from the main conduit to the control surfaces on both sides of the aircraft. In more detail, and as illustrated in the drawings, one or more conduits 29 deliver compressed air to a gap 30 formed between each of the downstream edges 11a of the wing 11 and the upstream edges 31a of the control surfaces, such as the flaps 31. Only one such flap 31 being shown, it being understood that the other flap or control surfaces of the wing 11 are similarly supplied with compressed air from conduits 29 communicating with the main conduit or manifold 27.

The air intake 23a of the auxiliary compressor 23 receives air through apertures 34 provided in the surface of the wing 11, preferably in the region of the leading edge, so that the boundary layer flow over the surface of the wing 11 is drawn into the chamber surrounding the intakes 23a of the auxiliary compressors 23 as shown by the arrows A. The provision of such apertures prevents the air flow over the surface of the wing 11 breaking away when the incidence of the wing 11 is inclined to the horizontal plane. As shown in FIGURE 3, a modified arrangement for supplying air to the compressors may include louvres 32 formed in the sides of the engine nacelle 19. The louvres 32 receive air from atmosphere.

When the aircraft is operating at low forward speed and requires a high degree of lift, such as during landing approach, the flaps 31 will be in the position shown by the dotted lines in FIGURE 2. When in this position, the air flowing over the wing 11 will not flow around the upstream edge 31a of the flap 31 but will tend to break-away in that region giving rise to loss in lifting efficiency.

In order to induce a flow of air over the surface of the flap 31 the clutch device 21 is engaged so that the auxiliary compressor 23 is driven by the turbine 15. The valve 26 is opened when the clutch device is engaged and the air compressed in the auxiliary compressor 23 flows through the conduit 24 into the main conduit 27 and then through the conduits 29 into the gap 30. The compressed air flowing from the gap 30 follows closely the curve of the upstream edge 31a and induces the normal airflow to follow the surface of the flap 31 without breaking away.

During normal flight the flap 31 will be in the position shown in full lines on FIGURE 2 and the clutches 21 will be disengaged so that the auxiliary compressors are stationary.

When more than one auxiliary compressor 23 is arranged to supply compressed air into the main conduit 27 the valves 26 prevent one auxiliary compressor surging due to one auxiliary compressor 23 being rotated prior to the other one. When closed, such as when the aircraft is at cruise conditions, the valves 26 also prevent the formation of ice in the stationary auxiliary compressors 23 by preventing the flow of air which may bring ice from the atmosphere into the compressor. If an engine 10 or auxiliary compressor 23 fail in operation, the valves 26 are closed to prevent a reverse flow of compressed air from the main conduit 27 to the failed auxiliary compressor 23.

The main conduit 27 may be provided with a valve, indicated at 33, which allows the interior of the main conduit 27 to be opened to atmosphere during starting of the auxiliary compressors 23 in order to prevent back pressures on the auxiliary compressors 32. The valve 33 is closed when all auxiliary compressors 23 have been started.

What we claim is:

1. An aircraft comprising: a wing having movable control surfaces on opposite sides of the longitudinal axis of the aircraft, a plurality of forward propulsion engines, a compressor driven by each of said engines, means for supplying air to the intake of each compressor, an outlet conduit connected to the discharge end of each of said compressors for delivering compressed air therefrom, valve means in each outlet conduit adjacent to the respective compressor and selectively operable to open and close the outlet conduit, a main manifold conduit extending through said wing adjacent control surfaces on opposite sides of the longitudinal axis of the aircraft, said main manifold being connected to each outlet conduit, and a plurality of discharge conduits connected with said main conduit for discharging compressed air over similar control surfaces on opposite sides of the longitudinal axis in order to prevent breakaway of normal atmospheric air flow over said control surfaces, at least one of said discharge conduits discharging air to each control surface and having its discharge end open to a gap between the trailing edge of the wing and the leading edge of the control surface.

2. An aircraft as claimed in claim 1 in which said main manifold conduit includes valve means selectively operable to open the interior of the main manifold conduit to atmosphere during starting of said compressors and closed when said compressors are being rotated at correct speed.

3. An aircraft as claimed in claim 1 in which said means for supplying air to the intake of each compressor includes apertures provided adjacent the leading edge of the wing.

4. An aircraft as claimed in claim 1 in which each of said forward propulsion engines is supported within a nacelle carried by said wing and in which said means for supplying air to the intake of each compressor includes louvres provided in the side of said nacelles.

5. An aircraft as claimed in claim 1 in which said forward propulsion engines are turbo-propeller engines including shafting and a selectively operable clutch for driving said compressors, said compressors being coaxially arranged with respect to said engines.

6. An aircraft as claimed in claim 1 in which said similar movable control surfaces are flaps positioned along the downstream edge of said wing.

References Cited in the file of this patent
UNITED STATES PATENTS
2,867,392    Lear ------------------ Jan. 6, 1959
FOREIGN PATENTS
1,181,233    France ---------------- Jan. 5, 1959